(12) United States Patent
Shinobu

(10) Patent No.: US 8,991,593 B2
(45) Date of Patent: Mar. 31, 2015

(54) CHAIN CONVEYOR

(71) Applicant: Tsubakimoto Chain Co., Osaka (JP)

(72) Inventor: Keiko Shinobu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 14/087,494

(22) Filed: Nov. 22, 2013

(65) Prior Publication Data

US 2014/0166443 A1 Jun. 19, 2014

(30) Foreign Application Priority Data

Dec. 18, 2012 (JP) ................................. 2012-275780

(51) Int. Cl.
| | | |
|---|---|---|
| *B65G 39/20* | (2006.01) | |
| *B65G 17/40* | (2006.01) | |
| *B65G 17/24* | (2006.01) | |
| *B65G 47/26* | (2006.01) | |

(52) U.S. Cl.
CPC ................ *B65G 17/24* (2013.01); *B65G 39/20* (2013.01); *B65G 17/40* (2013.01); *B65G 47/26* (2013.01)
USPC .......................................... 198/779; 198/853

(58) Field of Classification Search
CPC ........ B65G 39/20; B65G 15/30; B65G 17/08; B65G 17/083; B65G 17/40
USPC .......................................... 198/851–853, 779
See application file for complete search history.

(56) References Cited

U.S. PATENT DOCUMENTS

| | | | |
|---|---|---|---|
| 6,571,937 B1 | 6/2003 | Costanzo et al. | |
| 7,617,923 B2 * | 11/2009 | Riddick et al. | ........... 198/457.05 |
| 8,109,384 B2 * | 2/2012 | Pressler et al. | ................. 198/779 |
| 8,695,784 B2 * | 4/2014 | Ota | ............................ 198/690.1 |
| 2003/0085106 A1 | 5/2003 | Corley et al. | |
| 2004/0129539 A1 | 7/2004 | Corley et al. | |
| 2006/0237291 A1 | 10/2006 | Ozaki et al. | |
| 2013/0284568 A1 | 10/2013 | Murakami | |
| 2014/0159326 A1 * | 6/2014 | Copus | ......................... 280/28.5 |

FOREIGN PATENT DOCUMENTS

| | | |
|---|---|---|
| JP | 02-193805 A | 7/1990 |
| JP | 2003-182829 | 7/2003 |
| JP | 2004-262600 A | 9/2004 |
| JP | 2006-298619 | 11/2006 |
| WO | WO 01/32533 | 5/2001 |
| WO | WO 2009/014937 | 1/2009 |

OTHER PUBLICATIONS

Extended European Search Report for European Patent Application No. 13195666.6 dated Mar. 17, 2014, 6 pages.

International Search Report prepared by the Japanese Patent Office on Aug. 9, 2011, for International Application No. PCT/JP2011/061810.

(Continued)

*Primary Examiner* — Mark A Deuble

(74) *Attorney, Agent, or Firm* — Sheridan Ross P.C.

(57) ABSTRACT

A chain conveyor includes a chain constituted of a plurality of links foldably coupled by pins. The links include roller-equipped links each having a roller. The chain conveyor includes a pushing-up mechanism for pushing up each roller to a protruding position. At the protruding position, each roller protrudes upward above a loading surface of the chain, on which articles are loaded. Accumulated articles are supported by the rollers arranged at the protruding position so that the articles are separate from and above the loading surface.

4 Claims, 5 Drawing Sheets

(56) References Cited

OTHER PUBLICATIONS

Written Opinion prepared by the Japanese Patent Office on Aug. 9, 2011, for International Application No. PCT/JP2011/061810 (English Translation Version).

International Preliminary Report on Patentability issued by WIPO on Dec. 4, 2012, for International Application No. PCT/JP2011/061810.

Official Action for U.S. Appl. No. 13/877,048 mailed Oct. 31, 213, 8 pages.

* cited by examiner

CHAIN CONVEYOR

CROSS-REFERENCE TO RELATED APPLICATIONS

This application claims the benefit of Japanese Patent Application No. 2012-275780 filed Dec. 18, 2012, the entire disclosure of which is incorporated herein by reference.

BACKGROUND OF THE INVENTION

The present invention relates to a chain conveyor including a chain on which articles are loaded, and more specifically, relates to a chain conveyor of an accumulating type in which articles loaded on a loading surface of a chain are accumulated (that is, temporarily retained) on the chain running.

In this type of chain conveyor, the chain on which articles are loaded includes a plurality of links and a plurality of pins. Each link has a plurality of first hinge portions, a plurality of second hinge portions, and a loading surface, which extends between the first hinge portions and the second hinge portions in the longitudinal direction of the chain and on which articles are loaded. Each pair of links that are adjacent to each other in the longitudinal direction of the chain are foldably coupled to each other by a pin inserted through the first hinge portions and the second hinge portions (for example, see Japanese Laid-Open Patent Publication No. 2004-262600).

Moreover, a conveyor conveying articles is known in which articles are loaded on rollers that are coupled to and moved with a chain to run and are accumulated in a state where the rollers are moved (for example, see Japanese Patent Laid-Open No. 2-193805).

SUMMARY OF THE INVENTION

In a chain conveyor, while the articles loaded on the loading surface of the chain are being accumulated, the articles sliding on the loading surface cause friction on the loading surface of the running chain. Due to this, there have been a problem that running load on the chain increases to increase energy consumption for the operation of the chain conveyor and a problem that the accumulated articles sliding on the chain cause frictional wear of the chain and the articles to increase.

For example, in a conveying mode where the chain inclines such that an article is raised or lowered, while moving in the running direction, slippage of the article is liable to occur. Moreover, for example, also under an environment where a substance that decreases the coefficient of friction between the chain and the article (for example, edible oil or machining oil) is liable to intervene between the chain and the article, slippage of the article is also liable to occur. In such cases, in order to ensure desired conveying performance of the chain conveyor, the chain is sometimes designed such that the coefficient of friction between the loading surface of the chain and the article becomes large, or the chain is sometimes provided with a magnet to be mounted such that the article sticks to the loading surface due to magnetic attraction from the magnet. In such cases, the above-mentioned problems are further significant.

The present invention is to solve the above-mentioned problems, and its object is to provide a chain conveyor capable of reducing energy consumption for the operation by reducing running resistance of the chain caused by frictional resistance acting on the chain due to accumulated articles and capable of reducing frictional wear of the chain and the articles, improving durability of the chain and preventing breakage of the articles by reducing friction between the accumulated articles and the chain.

To achieve the foregoing objective, and in accordance with one aspect of the present invention, a chain conveyor is provided that includes: a chain that is configured of a plurality of links and a plurality of pins to extend in a longitudinal direction and is capable of conveying articles; and a stopper capable of accumulating articles conveyed by the chain. Each of the links has a plurality of first hinge portions, a plurality of second hinge portions, and a loading surface. The loading surface extends between the first hinge portions and the second hinge portions in the longitudinal direction of the chain and is capable of loading articles. Each of the pins is inserted through the first hinge portions and the second hinge portions of a pair of the links that are adjacent to each other in the longitudinal direction of the chain to foldably couple the links to each other. The links of the chain include a plurality of roller-equipped links each of which has a roller. Each roller is rotational around a rotation axis extending in a widthwise direction of the chain and is movable between a retracted position and a protruding position. Each roller does not protrude upward above the corresponding loading surface when arranged at the retracted position and protrudes upward above the loading surface when arranged at the protruding position. The chain conveyor includes a pushing-up mechanism that pushes up each roller from the retracted position to the protruding position. The rollers are configured to be arranged at the protruding position, when articles are accumulated by the stopper, to support the articles so that the articles are separate from and above the loading surface. The rollers are configured to maintain, when arranged at the retracted position, a state where the articles are loaded on the loading surface.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
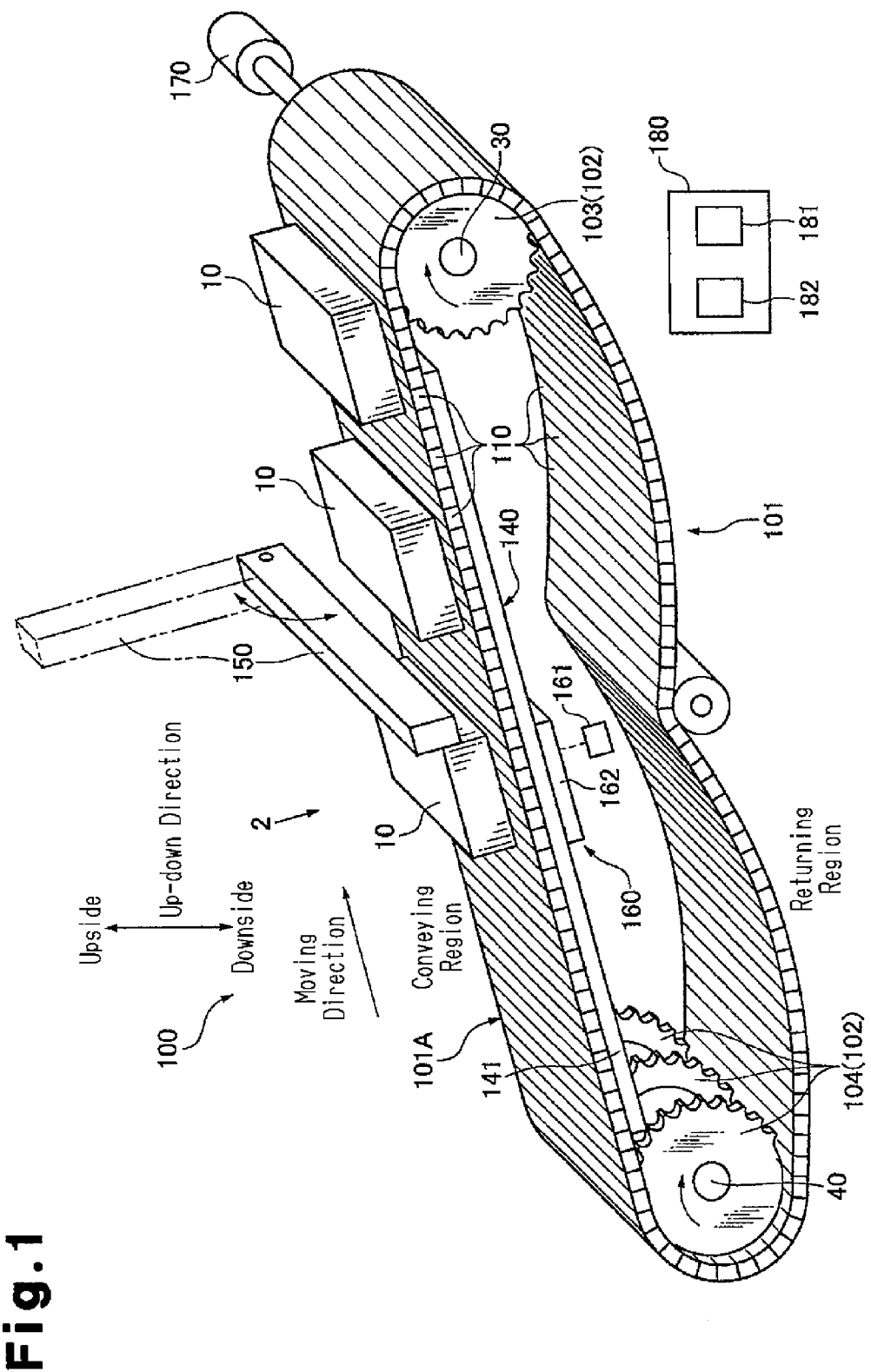
FIG. 1 is a schematic diagram of a chain conveyor according to one embodiment of the present invention.

A chain conveyor according to the present invention includes a chain that is configured of a plurality of links and a plurality of pins to extend in a longitudinal direction and is capable of conveying article and a stopper capable of accumulating articles conveyed by the chain. Each of the links has a plurality of first hinge portions, a plurality of second hinge portions, and a loading surface, which extends between the first hinge portions and the second hinge portions in the longitudinal direction of the chain and is capable of loading articles. Each of the pins is inserted through the first hinge portions and the second hinge portions of a pair of the links that are adjacent to each other in the longitudinal direction of the chain to foldaby couple the links to each other. The links of the chain include a plurality of roller-equipped links each of which has a roller. Each roller is rotational around a rotation axis extending in a widthwise direction of the chain and is movable between a retracted position and a protruding position. Each roller does not protrude upward above the corresponding loading surface when arranged at the retracted position and protrudes upward above the loading surface when arranged at the protruding position. The chain conveyor includes a pushing-up mechanism that pushes up each roller from the retracted position to the protruding position. The rollers are configured to be arranged at the protruding position, when articles are accumulated by the stopper, to support the articles so that the articles are separate from and above the loading surface. The rollers are configured to maintain, when arranged at the retracted position, a state where the articles are loaded on the loading surface. The chain conveyor according to the present invention may have any specific aspect as long as it meets the above-mentioned requirements. According to an aspect thereof, running resistance of the chain caused by frictional resistance acting on the chain due to accumulated articles is reduced and energy consumption for the operation is reduced. Moreover, friction between the accumulated articles and the chain is reduced, and thus, frictional wear of the chain and the articles is reduced, this allowing durability of the chain to be improved and breakage of the article to be prevented.

For example, in the chain conveyor according to the present invention, all of the links constituting the chain may have the loading surface, or part of all the links may have no loading surface. Moreover, constituent members of the chain may be formed of any of synthetic plastic and metal depending on the environment of use of the chain conveyor.

Regarding the rollers of the chain conveyor according to the present invention, the rollers located at the retracted position may have no contact with the article loaded on the loading surface. Alternatively, the rollers located at the retracted position may come into contact with a surface that includes the loading surface at its uppermost portion, and the uppermost portion may come into contact with the article loaded on the loading surface. Moreover, the rollers may have any shape or constitution as long as the rollers come into rolling contact with accumulated articles.

In order to configure a conveying facility out of a plurality of chain conveyors arranged side by side in the widthwise direction of their chains, multiple chain conveyors according to the present invention may be provided to be used. In this case, the chain conveyors according to the present invention may be used in a mode where articles are put over and conveyed by two or more of the chain conveyors.

Hereafter, one embodiment according to the present invention will be described with reference to FIGS. 1 to 7.

Referring to FIG. 1, a chain conveyor 100 includes an endless chain 101 and conveys a plurality of articles 10 loaded on the chain 101 by running the chain 101. The chain conveyor 100 includes a sprocket mechanism 102 having a plurality of sprockets, over which the chain 101 is put, and a guide rail 140 for guiding the running of the chain 101. The chain conveyor 100 includes an electric motor 170 for driving the chain 101 via the sprocket mechanism 102. The chain conveyor 100 includes a stopper 150 acting as accumulating means for accumulating the articles 10 loaded on the chain 101 on the running chain 101. The chain conveyor 100 further includes a pushing-up mechanism 160 for pushing up the articles 10 loaded on the chain 101 upward from the chain 101, and a controlling device 180 for controlling the pushing-up mechanism 160.

Figure 3:
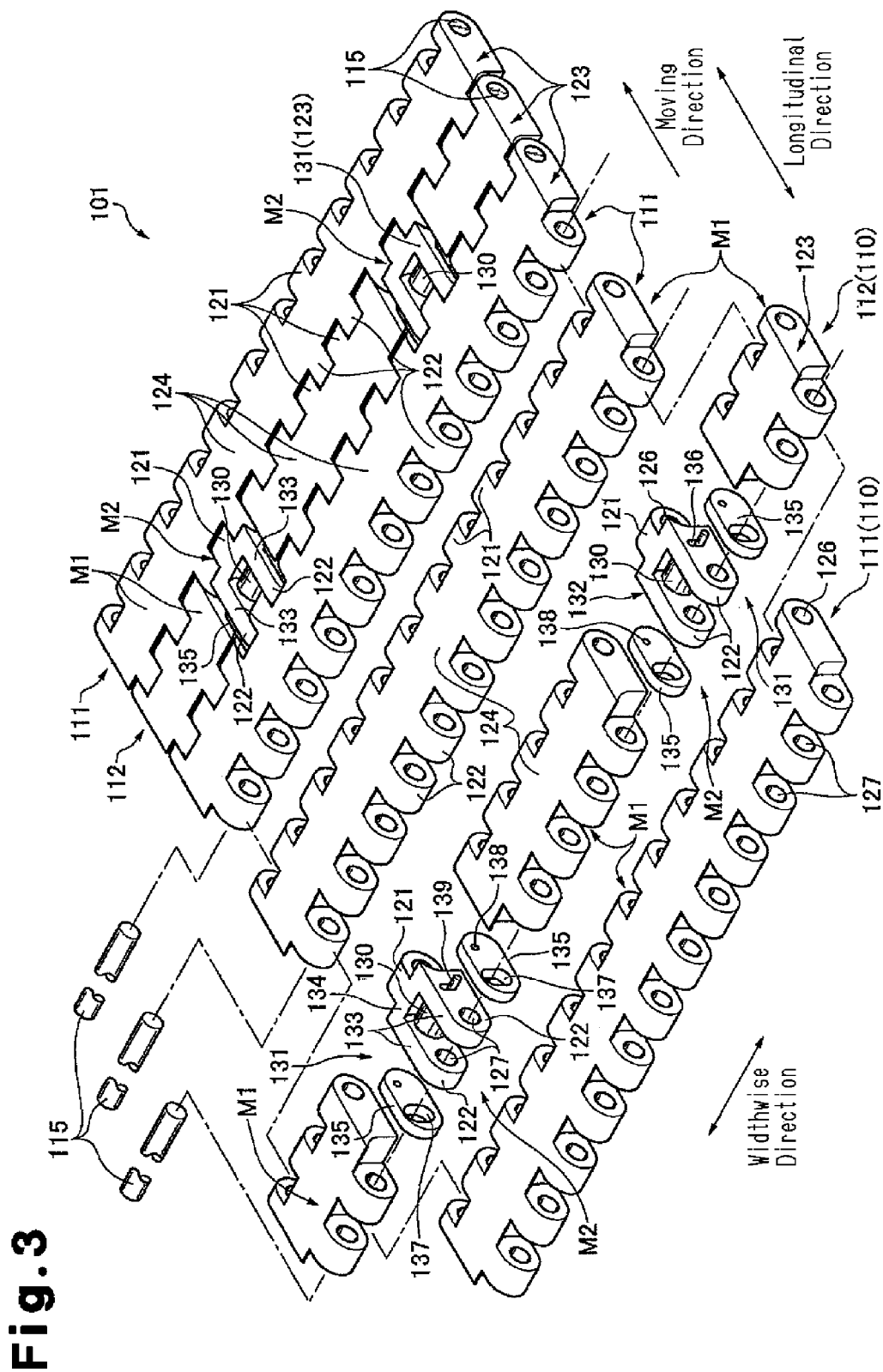
FIG. 3 is an exploded perspective view of the part of the chain in FIG. 2.

As shown in FIG. 3, the chain 101 includes a plurality of links 110 and a plurality of pins 115.

A running region, in which the chain 101 runs, includes a conveying region, in which the chain 101 conveys the articles 10, and a returning region, in which the chain 101 returns from the terminating end region of the conveying region to the beginning end region of the conveying region. The conveying region includes a guiding region in which the guide rail 140 is located. The part of the chain 101 that is included in the conveying region is referred to as a conveying part 101A. The conveying part 101A extends in a straight line shape by the guide rail 140 guiding the same in the guiding region.

The chain conveyor 100 may be configured to perform conveyance for which the conveying part 101A is inclined with respect to the horizontal direction to raise the articles 10 or to perform the conveyance to lower these (inclination conveying mode). FIG. 1 illustrates an example in which the chain conveyor 100 conveys and raises the articles 10. Moreover, the conveying part 101A may extend in the horizontal direction to convey the articles 10 in the horizontal direction (horizontal conveying mode).

The sprockets of the sprocket mechanism 102 include one or more (three in the embodiment) drive sprockets 103 and idler sprockets 104, the number of which is equal to that of the drive sprockets 103. The drive sprockets 103 are coupled to a drive shaft 30 driven to rotate by the electric motor 170. The drive sprockets 103 are caused to rotate by the electric motor 170 when the chain conveyor 100 operates. The idler sprockets 104 are rotationally supported on a supporting shaft 40.

The stopper 150 is moved such that its status is switched between an operation state, in which the articles 10 loaded on the chain 101 are accumulated, and a cancellation state, in which the accumulation is cancelled. The stopper 150 interrupts the conveyance of the article 10 that comes into contact with the stopper 150 in the operation state (position of the stopper 150 is indicated as one example by the solid lines in FIG. 1). The stopper 150 separates from the article 10 (no contact) in the cancellation state (position of the stopper 150 is indicated as one example by the broken lines in which a long dash alternates with a pair of short dashes in FIG. 1) to allow the conveyance of the article 10 by the chain 101.

The stopper 150 is driven to operate, for example, by an actuator (not shown) operated based on an operation switch 182 manipulated by an operator.

Figure 2:
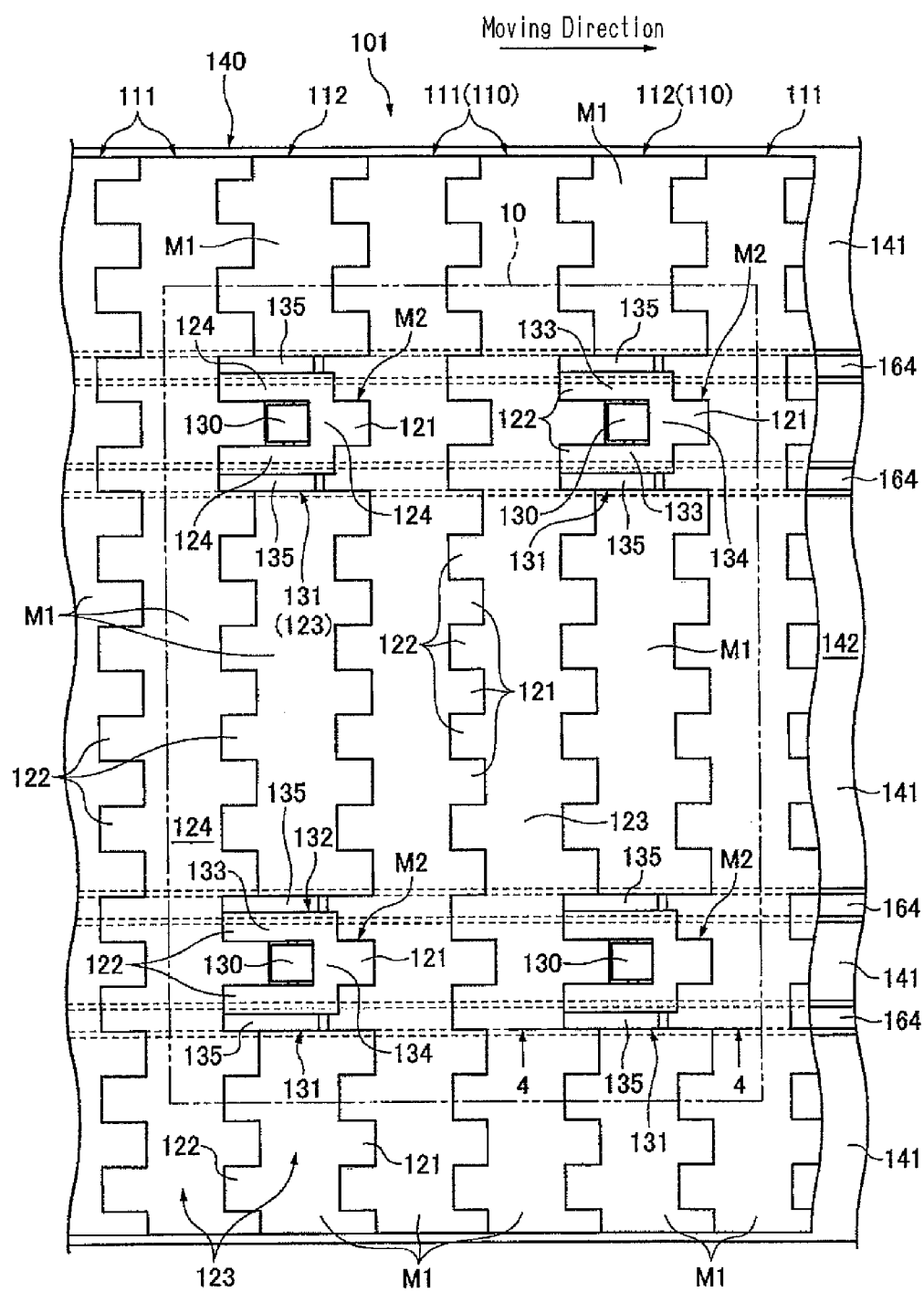
FIG. 2 is a plan view of a part of a chain of the chain conveyor, seen along arrow 2 in FIG. 1.

Referring to FIGS. 2 and 3, each link 110 of the chain 101 includes a plurality of first hinge portions 121 arranged on its one end in the longitudinal direction of the chain 101, a plurality of second hinge portions 122 arranged on the other end in the longitudinal direction of the chain 101, and a loading part 123 extending between the first hinge portions 121 and the second hinge portions 122, which are separated from each other in the longitudinal direction of the chain 101. On the loading part 123, the articles 10 being conveyed can be loaded. The loading part 123 has a loading surface 124 supporting the article 10.

In the conveying part 101A, the loading surfaces 124 face upward, and on the loading surfaces 124 moved in the running direction, the articles 10 are conveyed due to friction with the loading surfaces 124.

The link 110 includes one or more link modules M. The link modules M are categorized into roller-equipped modules M2, each of which has one or more rollers 130, and basic modules M1, each of which does not have any rollers 130.

The links 110 are categorized into basic links 111, each of which is constituted only of one or more basic modules M1, and roller-equipped links 112, each of which have one or more roller-equipped modules M2. Each roller-equipped link 112 includes one or more roller-equipped modules M2 and one or more basic modules M1. As an alternative example, each roller-equipped link 112 may consist only of one or more roller-equipped modules M2. The links 110 of the chain 101 include the roller-equipped links 112.

In the example shown in the drawings, each roller-equipped module M2 has one roller 130, and each roller-equipped link 112 includes roller-equipped modules M2 and basic modules M1.

The chain 101 includes the roller-equipped links 112 and the basic links 111. As an alternative example, the chain 101 may include only roller-equipped links 112.

Each of the basic modules M1 and roller-equipped modules M2 has one or more first hinge portions 121 arranged on one end in the longitudinal direction of the chain 101, and one or more second hinge portions 122 arranged on the other end in the longitudinal direction of the chain 101. Moreover, the link module M meshing with any of the sprockets 103 and 104 (basic module M1 in the example shown in the drawings) has a meshing part (not shown) with the sprockets 103 and 104.

Each first hinge portion 121 and each second hinge portion 122 have a first pin hole 126 and a second pin hole 127, respectively. The chain 101 is constituted by coupling each pair of links 110 that are adjacent to each other in the longitudinal direction of the chain 101 to each other with pins 115. In detail, each pair of links 110 are coupled to each other to be foldable around a folding axis La (FIG. 4), the first hinge portions 121 and the second hinge portions 122 arranged alternately in the widthwise direction of the chain 101. In this state, a pin 115 inserted through the first pin holes 126 and the second pin holes 127.

In the chain 101, the roller-equipped links 112 are arranged at a pitch with the same interval, with one or more (two in the embodiment) basic links 111 arranged therebetween, in the longitudinal direction of the chain 101. The interval corresponds to the clearance in the longitudinal direction of the chain 101 between the folding axes La (FIG. 4) that are adjacent to each other in the longitudinal direction.

As mentioned above, each basic module M1 has the loading part 123 extending between the first hinge portions 121 and the second hinge portions 122, which are separated in the longitudinal direction of the chain 101.

Each basic module M1 is a component composed of first hinge portions 121, second hinge portions 122, a loading part 123 and meshing parts, which are integrated. In the embodiment, each basic module M1 is a plastic-made member obtained by integrally molding synthetic plastic.

Referring to FIGS. 2 to 5, each roller-equipped module M2 has one or more (one in the embodiment) roller supporting bodies 131 arranged between the first hinge portion 121 and the second hinge portions 122, which are separated in the longitudinal direction of the chain 101. The roller supporting bodies 131 also act as the loading parts 123.

Each roller supporting body 131 has one or more (one in the embodiment) rollers 130, a link body 132 having a first hinge portion 121 and second hinge portions 122, at least pair of tabs 135 movable in the up-down direction with respect to the link body 132, and a roller shaft 139 supported on the pair of tabs 135.

The roller 130 is rotational with respect to the link body 132 and the tabs 135 via the roller shaft 139. The pair of tabs 135 rotationally supports the roller 130 via the roller shaft 139.

The link body 132 has at least a pair of side walls 133 arranged in the widthwise direction of the chain 101 to sandwich a roller 130, and a connecting wall 134 connecting the side walls 133. The side walls 133 and the connecting wall 134 constitute the loading surface 124. Each of the pair of side walls 133 has a first hinge portion 121. The connecting wall 134 has one second hinge portion 122. The pair of side walls 133 is arranged between a pair of tabs 135 in the widthwise direction of the chain 101.

Each roller-equipped module M2 is a plastic-made member. Specifically, each roller-equipped module M2 includes first hinge portions 121, second hinge portions 122, and a link body 132, which are integrated. In the embodiment, each roller-equipped module M2 is a plastic-made component obtained by integrally molding synthetic plastic. The tabs 135, the roller 130 and the roller shaft 139 are each a plastic-made component obtained by molding synthetic plastic.

Each tab 135 is arranged between a side wall 133 and a basic module M1 that are adjacent to each other in the widthwise direction of the chain 101, and is movable along the up-down direction, while sliding on the side wall 133 and the basic module M1.

Figure 4:
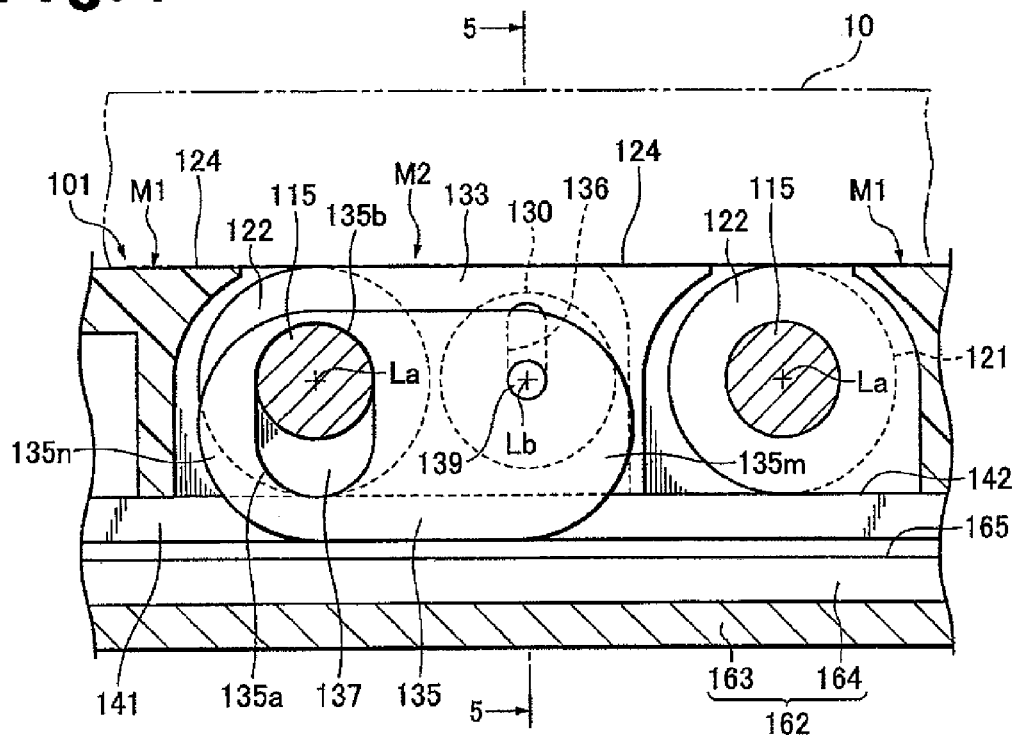
FIG. 4 is a cross-sectional view taken along line 4-4 in FIG. 2, showing an arrangement of a roller of the chain at a retracted position.
Figure 5:
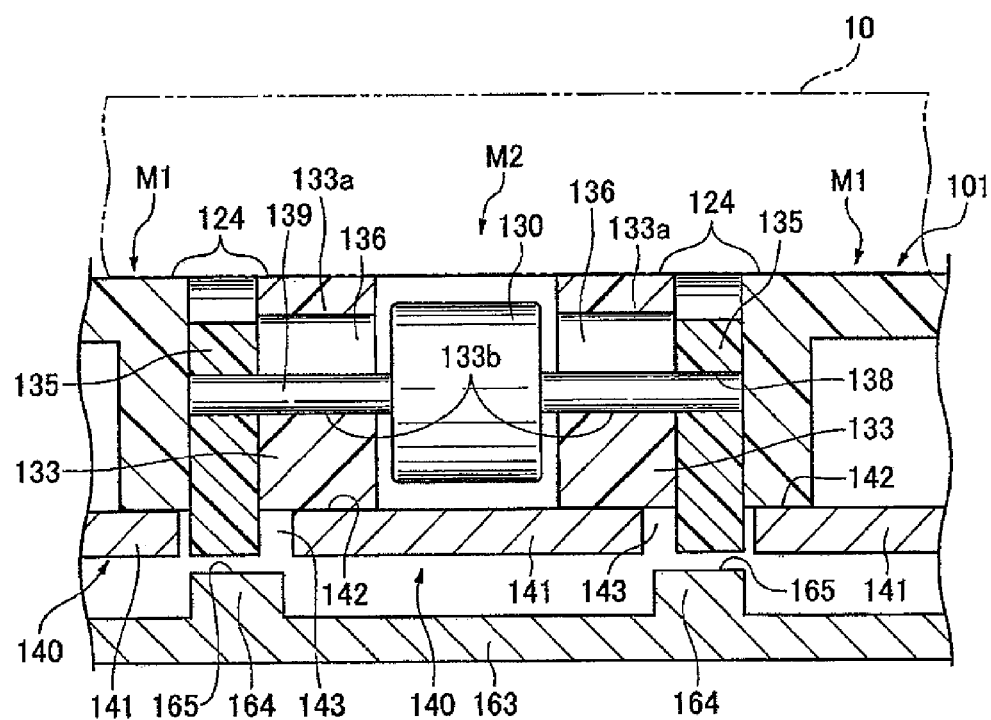
FIG. 5 is a partial cross-sectional view taken along line 5-5 in FIG. 4.

Both ends 135m and 135n of each tab 135 in the longitudinal direction of the chain 101 curve in arc shapes to protrude toward the downstream side and the upstream side in the running direction of the chain 101, respectively, seen along the widthwise direction of the chain 101. In the example shown in the drawings, the first hinge portions 121 and the second hinge portions 122 also have similar shapes to those of the both ends 135m and 135n of the tabs 135 (FIGS. 4 and 5).

Each roller 130 is columnar and arranged between a pair of side walls 133, and therefore, between the corresponding pair of tabs 135 in the widthwise direction of the chain 101. Each roller 130 is supported on the corresponding roller shaft 139 to be rotational around a rotation axis Lb extending in the widthwise direction of the chain 101. Each roller shaft 139 is fixed to the corresponding tabs 135 by being press fitted into insertion holes 138 formed in the tabs 135. As another example, each roller shaft 139 may be rotationally supported on the corresponding tabs 135, and in this case, for example, the roller 130 and the roller shaft 139 may be coupled to each other to rotate integrally.

Figure 6:
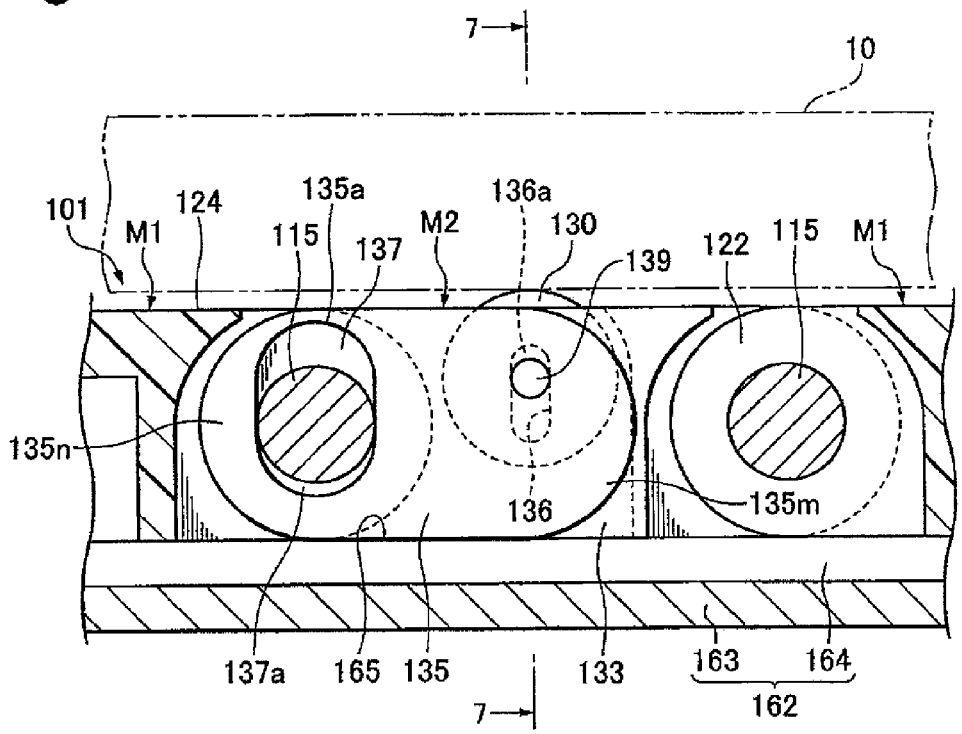
FIG. 6 is a cross-sectional view corresponding to FIG. 4, showing an arrangement of the roller of the chain at a protruding position.
Figure 7:
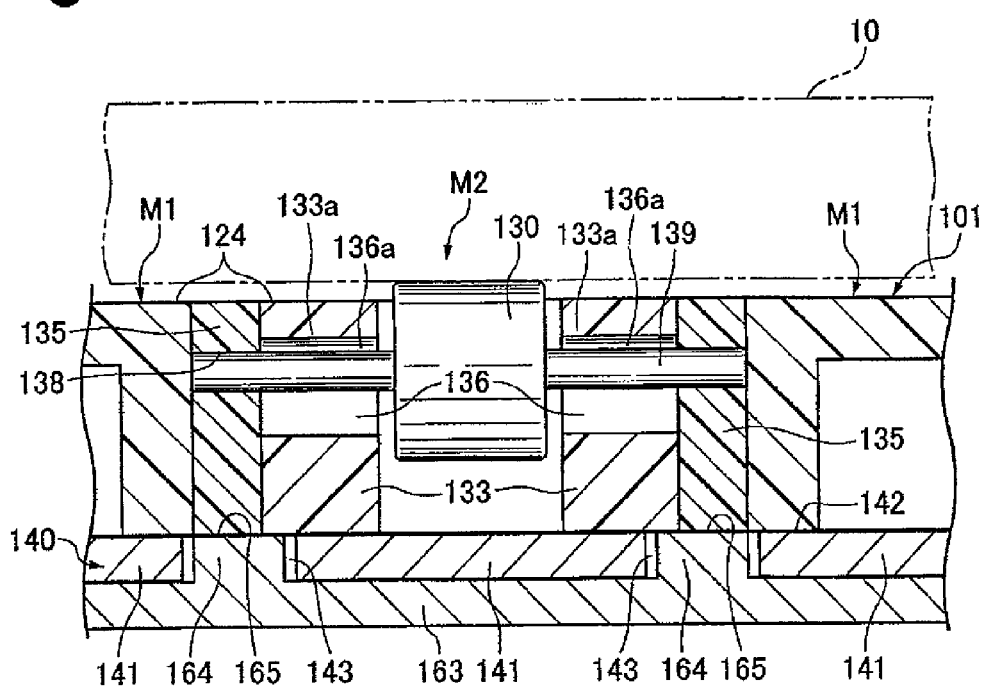
FIG. 7 is a cross-sectional view taken along line 7-7 in FIG. 6, which corresponds to FIG. 5.

Each roller 130 is movable in the up-down direction relatively to the loading surface 124 between a retracted position shown in FIGS. 2 to 5 and a protruding position shown in FIGS. 6 and 7. At the retracted position, the pushing-up mechanism 160 does not push up the rollers 130 and the rollers 130 do not protrude upward above the loading surface 124. At the protruding position, each roller 130 is pushed up by the pushing-up mechanism 160 to protrude upward above the loading surface 124. Namely, when moving from the protruding position to the retracted position, the roller 130 is lowered from the upside above the loading surface 124 at least down to the same height as the loading surface 124. In the example shown in the drawings, at the retracted position, the entirety of the roller 130 is located below the loading surface 124.

Each side wall 133 has an insertion space 136, through which the corresponding roller shaft 139 is inserted. The insertion spaces 136 are each constituted of an oblong hole extending in the up-down direction. In order to allow the movement of the corresponding roller 130 between the retracted position and the protruding position, each pair of the insertion spaces 136 allow the roller shaft 139 to move along with the roller 130 in the up-down direction.

Each tab 135 has a pin space 137, through which the corresponding pin 115 is inserted. Each pin space 137 is constituted of an oblong hole extending in the up-down direction. The pin spaces 137 enable the tabs 135 to move in the up-down direction relative to the pin 115. Through the pin spaces 137 of the tabs 135, only one pin 115, which is inserted through any one of the first hinge portion 121 and the second hinge portion 122 of the roller-equipped module M2, is inserted. In the embodiment, the pin 115 that is inserted through the second hinge portion 122 of the roller-equipped module M2 is inserted through the pin spaces 137 of the tabs 135.

Each side wall 133 has an insertion space forming part 133a forming the insertion space 136, and each tab 135 has a pin space forming part 135a forming the pin space 137. The insertion space forming part 133a has an end 133b in the up-down direction, and the corresponding roller shaft 139 comes into contact with the end 133b at the retracted position of the roller 130. The pin space forming part 135a has an end 135b in the up-down direction, and the corresponding pin 115 comes into contact with the end 135b at the retracted position of the roller 130. Thus, the end 133b of the insertion space forming part 133a and the end 135b of the pin space forming part 135a define the retracted position of the corresponding roller 130 and maintain the tab 135 in the no-contact state, where the tab 135 is separated from the pushing-up rail 164 of the pushing-up mechanism 160 at the retracted position.

Each pair of the insertion space forming parts 133a constitute a guiding part that slidably guides the corresponding roller shaft 139 in the up-down direction while restricting the movement of the roller shaft 139 toward both orientations in the longitudinal direction of the chain 101, that is, the movement of the roller shaft 139 toward the upstream side and the downstream side in the running direction. Moreover, each pair of the pin space forming parts 135a constitute a guiding part that slidably guides the corresponding pin 115 in the up-down direction while restricting the movement of the pin 115 toward both orientations in the longitudinal direction of the chain 101. As described above, the insertion space forming parts 133a and the pin space forming parts 135a define the movement path of the roller 130 between the retracted position and the protruding position.

Referring to FIGS. 1, 2 and 4 to 7, the guide rail 140 is fixed below the conveying part 101A using a supporting member (not shown). The guide rail 140 includes a plurality of divided guide rail sections 141 arranged at intervals in the widthwise direction of the chain 101. Between each pair of divided guide rail sections 141 that are adjacent to each other in the widthwise direction of the chain 101, a movement allowance space 143 is formed. Each movement allowance space 143 has a sufficient width with which one or more (one in the embodiment) pushing-up rail 164 is movable in the up-down direction in the movement allowance space 143.

Each divided guide rail section 141 has a guiding surface 142, with which slidingly contacts the loading parts 123 (including the roller supporting body 131) of the link modules M of the links 110 in the conveying part 101A. By the loading parts 123 slidingly contacting the guiding surfaces 142, the conveying part 101A is guided to run straight in the running direction (FIG. 1).

The pushing-up mechanism 160 includes an actuator 161 schematically shown in FIG. 1, and a movable body 162, which is driven by the actuator 161 to move in the up-down direction and located on the upstream side of the stopper 150 in the running direction. The movable body 162 is movable between a pushing-up cancellation position shown in FIGS. 4 and 5 and a pushing-up holding position shown in FIGS. 6 and 7. When the movable body 162 is located at the pushing-up cancellation position, the rollers 130 are located at the retracted position. When the movable body 162 is located at the pushing-up holding position, the rollers 130 are located at the protruding position.

The movable body 162 has a base part 163 in a flat plate shape, and one or more (a plurality of, in the present embodiment) pushing-up rails 164, each of which has a pushing-up surface 165 that contacts a tab 135. Each pushing-up rail 164 is located at a position corresponding to a tab 135 in the widthwise direction of the chain 101.

A region in which the pushing-up rails 164 and base part 163 are arranged is referred to as an accumulation region. The accumulation region is included in the guiding region in the longitudinal direction of the chain 101.

The pushing-up rails 164 protrude upward from the base part 163 and extend in straight line shapes in the longitudinal direction of the chain 101. At the pushing-up cancellation position, the pushing-up rails 164 are arranged downwardly separate from the tabs 135. When the rollers 130 are moved upward from the retracted position toward the protruding position, the pushing-up rails 164 are moved upward to the pushing-up holding position. At this stage, the pushing-up rails 164 come into contact with the tabs 135 and push up, as well as the tabs 135, the roller shafts 139 and rollers 130 to move the rollers 130 to the protruding position.

The guiding surface 142 and the pushing-up surface 165 are flat surfaces parallel to each other and extend in the longitudinal direction and the widthwise direction of the chain 101. When the rollers 130 are located at the protruding position, the pushing-up surface 165 and the guiding surface 142 are arranged in the same plane. As described above, the pushing-up mechanism 160 moves the tabs 135 in the up-down direction, and thereby, moves the rollers 130 between the retracted position and the protruding position.

The base part 163 comes into contact with the divided guide rail sections 141, and thereby, acts as a positioning part for defining the pushing-up holding position and the protruding position. In the state where the pushing-up surfaces 165 of the pushing-up rails 164 at the pushing-up holding position come into contact with the tabs 135, a clearance 136a is formed above the roller shaft 139 in each insertion space 136, and a clearance 137a is formed below the pin 115 in each pin space 137 (FIGS. 6 and 7). Namely, in this state, the side walls 133 do not come into contact with the roller shaft 139 in the up-down direction, and the tabs 135 do not come into contact with the pin 115. When, in order to define a protruding position, the pushing-up rails 164 press the roller shaft 139 against the insertion space forming parts 133a via the tabs 135 and press the pin 115 against the pin space forming parts 135a, load acts the roller shaft 139 and the pin 115. On the contrary, in the embodiment, since the pushing-up rails 164 can be prevented from applying load on the roller shaft 139 and the pin 115 via the tabs 135, durability of the roller shaft 139 and the pin 115 are improved.

Referring to FIG. 1, the controlling device 180 has a controlling section 181 and an operation switch 182 acting as accumulation detecting means for detecting that the stopper 150 is in the operation state. The controlling section 181 controls the actuator 161 of the pushing-up mechanism 160 in response to a signal from the operation switch 182.

Referring also to FIGS. 4 to 7, specifically, when determining that the stopper 150 is in the operation state on the basis of the signal from the operation switch 182, the controlling section 181 drives the actuator 161 to raise the pushing-up rail 164 to the pushing-up holding position and to move the rollers 130 to the protruding position. Moreover, when determining that the stopper 150 is in the cancellation state on the basis of the signal from the operation switch 182, the controlling section 181 lowers the pushing-up rail 164 to the pushing-up cancellation position such that the rollers 130 are located at the retracted position.

Thereby, at the time point when the stopper 150 is in the operation state, the actuator 161 is controlled by the controlling section 181 to move the movable body 162 upward. Thus, the pushing-up rail 164 is moved upward from the pushing-up cancellation position to the pushing-up holding position and maintains the pushing-up holding position. Due to this, when the roller-equipped link 112 running on the upstream side of the accumulation region or the pushing-up rail 164 in the running direction enters the accumulation region, the tabs 135 start slidingly contacting the pushing-up surfaces 165 at the pushing-up holding position. At this stage, the tabs 135 are pushed upward by the pushing-up rails 164, and the rollers 130, as well as the tabs 135, are pushed up to be moved from the retracted position to the protruding position. While the tabs 135 are slidingly contacting the pushing-up surfaces 165, the rollers 130 stay at the protruding position in the accumulation region.

Due to this, in the conveying part 101A, articles 10 being conveyed on the upstream side of the accumulation region or the pushing-up rail 164 in the running direction or articles 10 that are in the accumulation region and do not come into contact with the stopper 150 on the upstream side of the stopper 150 in the running direction are pushed up from the loading surface 124 by the rollers 130 at the protruding position. Then, the articles 10 that are accumulated in the accumulation region by coming into contact with the stopper 150 are supported on the rollers 130 at the protruding position separate from the loading surface 124 above the loading surface 124.

When the tabs 135 start coming into contact with the pushing-up rails 164, the arc-shaped ends 135m of the tabs 135 start coming into contact with the pushing-up rails 164, and the tabs 135 are pushed up continuously along the ends 135m. Hence, noise caused by the tabs 135 coming into contact with the pushing-up rails 164 is reduced.

When the conveying part 101A is configured to convey the articles 10 while raising them, the friction between the held article 10 and the rollers 130 and the running speed of the chain 101 during the accumulation are configured such that the held article 10 does not slide down toward the upstream side or escape from the accumulation region in the running direction. In the present embodiment, the held articles 10 maintain the state of being brought into contact with the stopper 150.

Moreover, at the time point when the stopper 150 is switched to the cancellation state, the actuator 161 moves the movable body 162 downward from the pushing-up holding position to the pushing-up cancellation position. Thereby, the tabs 135 brought into no contact with the pushing-up rails 164 move downward due to the gravity and the rollers 130 move from the protruding position to the retracted position. Due to this, articles 10 loaded on the loading surface 124 on the upstream side of the accumulation region maintain the loaded state, coming into contact with the loading surface 124 also after entering the accumulation region. Moreover, articles 10 supported on the rollers 130 at the protruding position in the accumulation region return to the state of coming into contact with the loading surface 124 to be conveyed, supported on the loading surface 124.

Next, operation and effects of the embodiment according to the present invention configured as mentioned above will be described.

The chain conveyor 100 includes the stopper 150 for accumulating articles 10 conveyed by the running chain 101 driven by the electric motor 170. The chain 101 includes the links 110 continuously arranged in the longitudinal direction of the chain 101. Each link 110 includes first hinge portions 121 and second hinge portions 122. Each pair of links 110 that are adjacent to each other in the longitudinal direction of the chain 101 are foldably coupled to each other by a pin 115 inserted through the first hinge portions 121 and the second hinge portions 122. In each link 110, a loading part 123 is formed between the first hinge portions 121 and the second hinge portions 122 in the longitudinal direction of the chain 101. The loading part 123 has a loading surface 124, on which an article 10 is loaded.

While conveying articles 10 loaded on the loading surfaces 124 of the chain 101, the chain conveyor 100 is capable of accumulating articles 10 by the stopper 150.

The links 110 of the chain 101 include the roller-equipped links 112 each having rollers 130. Each roller 130 is movable between the retracted position, where it does not protrude upward above the loading surface 124, and the protruding position, where it protrudes upward above the loading surface 124. The chain conveyor 100 includes the pushing-up mechanism 160 for pushing up the rollers 130 from the retracted position to the protruding position. When the rollers 130 are located at the protruding position, the held article 10 is supported on the rollers 130 separate from and above the loading surface 124. When the rollers 130 are located at the retracted position, the article 10 maintains the state of being loaded on the loading surface 124.

Thereby, when the article 10 loaded on the loading surface 124 is held to be accumulated, the rollers 130 pushed up by the pushing-up mechanism 160 from the retracted position to the protruding position push up the article 10 loaded on the loading surface 124 during the process of elevating movement. When located at the protruding position, the rollers 130 support the article 10 above the loading surface 124, while rotating at positions separate from the loading surface 124. Hence, the held article 10 comes into rolling contact with the rollers 130 of the running chain 101, and friction between the article 10 and the chain 101 is reduced compared with that in a case where the article 10 is sliding on the loading surface 124 of the chain 101. Thereby, since frictional resistance acting on the chain 101 due to the article 10 is reduced, running resistance acting on the chain 101 due to the held article 10 is reduced, running load on the chain 101 and energy consumption of the electric motor 170 for operating the chain conveyor 100 are reduced. In addition, since the frictional resistance acting on the chain 101 due to the article 10 is reduced, frictional wear of the chain 101 and the article 10 is reduced. Also, durability of the chain 101 is improved, and breakage of the articles 10 is prevented.

Each roller-equipped link 112 has roller-equipped modules M2 having a roller 130. Each roller-equipped module M2 includes a first hinge portion 121, second hinge portions 122, and a roller supporting body 131 rotationally supporting a roller 130. The roller 130 is movable between the retracted position and the protruding position relative to the roller supporting body 131.

Thereby, roller-equipped modules having a roller 130 for moving the article 10 upward and away from the loading surface 124 can be incorporated in each link 110 having first hinge portions 121 and second hinge portions 122 on a module-by-module basis. Hence, various roller-equipped links 112 having rollers 130 arranged in various manners in accordance with various shapes of articles 10 to be loaded can be easily fabricated. This facilitates the fabrication of the chain 101 including such roller-equipped links 112. Accordingly, as to the chain 101, the arrangement of the rollers 130 pushing up the articles 10 can be designed flexibly.

Each roller supporting body 131 includes a link body 132 having a first hinge portion 121, second hinge portions 122, and a pair of tabs 135 rotationally supporting a roller 130. The pushing-up mechanism 160 moves the pair of tabs 135 relative to the link body 132 such that the roller 130 is moved between the retracted position and the protruding position.

Thereby, the pushing-up mechanism 160 moves the pair of tabs 135 for each roller supporting body 131, and thereby, moves the roller 130 between the retracted position and the protruding position via the tabs 135. Hence, the roller 130 at the protruding position smoothly rotates due to its friction to the held article 10. Namely, the roller 130 comes into rolling contact with the article 10, enabling friction between the article 10 and the roller 130 to be reduced so that running resistance on the chain 101 during the accumulation is reduced.

Each roller supporting body 131 includes a roller shaft 139 supporting a roller 130 while being supported on a pair of tabs 135. The link body 132 includes a pair of side walls 133 to sandwich the roller 130 in the widthwise direction of the chain 101. The roller 130 is located between the side walls 133, and thus, between the tabs 135 in the widthwise direction of the chain 101. The side walls 133 has insertion spaces 136, through which the roller shaft 139 is inserted, and the roller shaft 139 is movable in the insertion spaces 136 during the movement of the roller 130 between the retracted position and the protruding position. The insertion spaces 136 are formed between the first hinge portions 121 and the second hinge portions 122 in the longitudinal direction of the chain 101. The tabs 135 have pin spaces 137, through which only one pin 115 is inserted.

Thereby, the supporting structure of the roller supporting body 131 supporting the pair of tabs 135 is configured of the only one pin 115 inserted through the tabs 135 and the roller shaft 139 inserted through the insertion spaces 136 formed between the first hinge portions 121 and the second hinge portions 122 in the longitudinal direction of the chain 101. Hence, the dimension of the tabs 135 in the longitudinal direction of the chain 101 can be reduced, which reduces weight of the roller-equipped module M2, and thus the weight of the chain 101. In this viewpoint, energy consumption of the electric motor 170 can also be reduced.

Moreover, the insertion space forming parts 133a, which form the insertion spaces 136, and the pin space forming part 135a, which form the pin spaces 137, define the retracted position of the roller 130. Thereby, the retracted position of the roller 130 is defined by using the roller shaft 139 inserted through the side walls 133 and the pin 115 inserted through the tabs 135. Hence, the structure for defining the retracted position in the roller supporting body 131 is simplified. This reduces the weight of the roller-equipped modules M2, and thus the weight of the chain 101.

Furthermore, at the retracted position, the side walls 133 come into contact with the roller shaft 139 and the tabs 135 come into contact with the pin 115. This allows the tabs 135 to be held in the no-contact state from the pushing-up mechanism 160. Thereby, when the rollers 130 are located at the retracted position, frictional wear of the tabs 135 can be reduced compared with the case where the tabs 135 come into contact with the pushing-up rails 164 of the pushing-up mechanism 160. This improves durability of the tabs 135 and thus durability of the chain 101.

The chain conveyor 100 includes the guide rail 140, with which the links 110 of the running chain 101 come into sliding contact. The pushing-up mechanism 160 includes the pushing-up rails 164, which are movable in the up-down direction, and the tabs 135 can slidingly contact the pushing-up rails 164. The pushing-up rails 164 move upward to push up the tabs 135, and thereby, move the rollers 130 from the retracted position to the protruding position. The guide rail 140 includes the divided guide rail sections 141 arranged at intervals in the widthwise direction of the chain 101. Between divided guide rail sections 141 that are adjacent to each other in the widthwise direction of the chain 101, a movement allowance space 143 is formed, in which the pushing-up rail 164 is arranged movably in the up-down direction.

Thereby, in the guiding region, in which the chain 101 is guided by the guide rail 140, fluctuation of the position of the chain 101 in the up-down direction is suppressed by the guide rail 140. Moreover, the pushing-up rails 164 pushing up the tabs 135 supporting the rollers 130 are arranged between divided guide rail sections 141 that are adjacent to each other in the widthwise direction of the chain 101. Hence, since the protruding position of the rollers 130 with respect to the loading surfaces 124 is ensured, the rollers 130 separate the held article 10 reliably from the loading surfaces 124 with a constant clearance in the up-down direction. Accordingly, running resistance of the chain 101 due to the rollers 130 is reduced.

The above-mentioned embodiment may be modified as follows.

In order to allow an article that is formed of magnetic material to stick to the loading surface 124, each basic module M1, which is formed of non-magnetic material, may incorporate a magnet. Also in this case, friction between accumulated articles and the chain 101 is reduced and frictional resistance acting on the chain 101 due to the articles is reduced. Moreover, since the magnetic attraction acting on an article becomes small when the article is separated from the loading surface 124, running resistance acting on the chain 101 due to accumulated articles is reduced, and thus, running load on the chain 101 is reduced. Reduction of the friction between articles and the chain 101 reduces frictional wear of the chain 101 and articles.

Each roller-equipped module M2 may have no tabs 135. In this case, the roller 130 may be supported on a pair of side walls 133 rotationally and movably in the up-down direction via the roller shaft 139, and the pushing-up mechanism 160 may push up the roller 130 directly or via the roller shaft 139.

The tabs 135 may be configured to swing in the up-down direction around the pin 115 as a swing center. In this case, the pin spaces 137 of the tabs 135 are constituted, for example, of holes with the same hole diameter as those of the pin holes 126 and 127.

Each pair of tabs 135 may be arranged between a pair of side walls 133.

The pushing-up mechanism 160 may be configured to move the tabs 135 forcibly using the actuator 161 to move the rollers 130 from the protruding position to the retracted position.

The running direction may be reverse to the direction shown in the drawings.

Therefore, the present examples and embodiments are to be considered as illustrative and not restrictive and the invention is not to be limited to the details given herein, but may be modified within the scope and equivalence of the appended claims.

The invention claimed is:

1. A chain conveyor comprising:
a chain that is configured of a plurality of links and a plurality of pins to extend in a longitudinal direction and is capable of conveying articles; and
a stopper capable of accumulating articles conveyed by the chain, wherein
each of the links has a plurality of first hinge portions, a plurality of second hinge portions, and a loading surface, which extends between the first hinge portions and the second hinge portions in the longitudinal direction of the chain and is capable of loading articles,
each of the pins is inserted through the first hinge portions and the second hinge portions of a pair of the links that are adjacent to each other in the longitudinal direction of the chain to foldably couple the links to each other,
the links of the chain include a plurality of roller-equipped links each of which has a roller,
each roller is rotational around a rotation axis extending in a widthwise direction of the chain and is movable between a retracted position and a protruding position,
each roller does not protrude upward above the corresponding loading surface when arranged at the retracted position and protrudes upward above the loading surface when arranged at the protruding position,
the chain conveyor includes a pushing-up mechanism that pushes up each roller from the retracted position to the protruding position,
the rollers are configured to be arranged at the protruding position, when articles are accumulated by the stopper, to support the articles so that the articles are separate from and above the loading surface, and
the rollers are configured to maintain, when arranged at the retracted position, a state where the articles are loaded on the loading surface;
wherein each roller-equipped link has a roller-equipped module having the corresponding roller,
each roller-equipped module has at least one of the first hinge portions, at least one of the second hinge portions, and a roller supporting body rotationally supporting the corresponding roller, and
each roller is movable between the retracted position and the protruding position relative to the corresponding roller supporting body.

2. The chain conveyor according to claim 1, wherein
each roller supporting body has a link body having at least one of the first hinge portions, and at least one of the second hinge portions, and a pair of tabs that is movable relative to the link body and rotationally supports the corresponding roller, and
the pushing-up mechanism moves each roller between the retracted position and the protruding position by moving the corresponding pair of tabs relative to the corresponding link body.

3. The chain conveyor according to claim 2, wherein
each roller supporting body has a roller shaft that is supported on the corresponding pair of the tabs and supports the corresponding roller,
each link body has a pair of side walls,
each roller is arranged between the corresponding pair of the tabs and between the corresponding pair of the side walls in the widthwise direction of the chain,
in each of the side walls, an insertion space for receiving the corresponding roller shaft is formed,
each roller shaft is movable in the corresponding insertion space during movement of the corresponding roller between the retracted position and the protruding position,
each insertion space is formed between the corresponding first hinge portion and the corresponding second hinge portion in the longitudinal direction of the chain, and
in each of the tabs, a pin space through which only one of the pins is inserted is formed.

4. The chain conveyor according to claim 2, further comprising a guide rail, with which the links of the chain come into sliding contact when the chain runs, wherein
the pushing-up mechanism has a pushing-up rail, which is movable in an up-down direction,
the tabs are capable of coming into sliding contact with the pushing-up rail,
the pushing-up rail moves upward to push up the tabs and to move the rollers from the retracted position to the protruding position,
the guide rail includes a plurality of divided guide rail sections arranged at intervals in the widthwise direction of the chain, and
between a pair of divided guide rail sections that are adjacent to each other in the widthwise direction of the chain, the pushing-up rail is arranged to be movable in the up-down direction.

* * * * *